United States Patent
Ballard et al.

(10) Patent No.: US 9,249,800 B2
(45) Date of Patent: Feb. 2, 2016

(54) BYPASS DIRECTIONAL CONTROL VALVE

(71) Applicant: Hamilton Sundstrand Corporation, Windsor Locks, CT (US)

(72) Inventors: Peter M. Ballard, Enfield, CT (US); Richard H. Bostiga, Ellington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 445 days.

(21) Appl. No.: 13/666,032

(22) Filed: Nov. 1, 2012

(65) Prior Publication Data

US 2014/0119956 A1    May 1, 2014

(51) Int. Cl.
*F04C 14/26* (2006.01)
*F16K 11/07* (2006.01)

(52) U.S. Cl.
CPC ........... *F04C 14/26* (2013.01); *F16K 11/07* (2013.01); *F04C 2270/58* (2013.01); *Y10T 137/0502* (2015.04); *Y10T 137/86879* (2015.04)

(58) Field of Classification Search
CPC ........... F02C 7/232; F02C 9/263; F02C 9/26; F04B 9/36; F04B 49/08; F04B 49/22; F04B 49/24; F16K 31/0613; F16K 11/07
USPC .......... 417/228, 313, 307, 308, 440; 137/597, 137/625.5; 60/730, 734
See application file for complete search history.

(56) References Cited

U.S. PATENT DOCUMENTS

| | | | | |
|---|---|---|---|---|
| 3,089,509 | A | * | 5/1963 | Collins ................ 137/454.6 |
| 3,430,919 | A | | 3/1969 | Frazier |
| 3,774,634 | A | | 11/1973 | Bonney |
| 3,814,378 | A | | 6/1974 | Wurzburger |
| 4,020,632 | A | * | 5/1977 | Coffinberry et al. ........... 60/773 |
| 4,241,753 | A | * | 12/1980 | Erwin et al. ............. 137/116.3 |
| 4,658,859 | A | | 4/1987 | Backe et al. |
| 4,696,156 | A | * | 9/1987 | Burr et al. .................. 60/39.08 |
| 6,224,356 | B1 | | 5/2001 | Dewar et al. |
| 6,886,665 | B2 | | 5/2005 | Parsons et al. |
| 7,343,934 | B2 | * | 3/2008 | Pride et al. ............. 137/625.64 |
| 7,537,027 | B2 | | 5/2009 | Bass et al. |
| 8,015,825 | B2 | | 9/2011 | Elder et al. |
| 8,181,669 | B2 | | 5/2012 | Dehais et al. |
| 2011/0253231 | A1 | * | 10/2011 | Dore et al. ................. 137/511 |
| 2013/0283811 | A1 | * | 10/2013 | Potel et al. ................. 60/776 |

* cited by examiner

*Primary Examiner* — Charles Freay
*Assistant Examiner* — Kenneth J Hansen
(74) *Attorney, Agent, or Firm* — Carlson, Gaskey & Olds, PC

(57) ABSTRACT

A bypass directional control valve has a valve sleeve, and two sets of outlet ports on each of two axial sides of the inlet ports. The outlet and the inlet ports all are formed to be cylindrical holes, and a diameter of the inlet ports is greater than a diameter of the outlet ports. A valve sleeve, a spool, a fluid flow system and a method are all also disclosed.

10 Claims, 3 Drawing Sheets

BYPASS DIRECTIONAL CONTROL VALVE

BACKGROUND OF THE INVENTION

This application relates to a bypass directional control valve for use in a pumping system.

Pumping systems are known, and utilized in any number of applications. One application is a gear pump delivering fuel to accessories on a gas turbine engine, such as to a Fuel/Oil Cooler (FOC).

In known systems, a pressure regulating valve is positioned downstream of the gear pump, and operates to bypass a portion of the pumped fluid back to an inlet for the gear pump.

A bypass directional control valve receives the bypass fluid downstream of the pressure regulating valve, and directs the bypass flow into two paths. A first path may be delivered through a heat exchanger, such as a fuel oil cooler, and the second path may be delivered without passing through such a cooler. The bypass directional control valve receives a control pressure signal to move to distinct positions to control the amount of fluid delivered to the two paths, respectively.

Bypass directional control valves in the prior art have resulted in undesirably high pressure losses.

SUMMARY OF THE INVENTION

A bypass directional control valve has a valve sleeve received in a housing. The housing includes an input opening to receive a source of fluid. The inlet opening communicates with two sets of inlet ports formed through the valve sleeve, and into an interior bore of the valve sleeve. Two sets of outlet ports are provided, with one on each of two axial sides of the inlet ports and extending through the valve sleeve. The sets of outlet ports, and inlet ports all are formed to be cylindrical holes. A diameter of the inlet ports is greater than a diameter of the outlet ports. The outlet ports communicate to outlet openings in the housing. A valve spool moves within the bore of the valve sleeve and has a land associated with each of the sets of the outlet ports. A spring biases the valve spool in a first direction such that a first land blocks a first of the sets of outlet ports, and a second land is spaced from a second set of outlet ports. A pressure tap receives a pressure control signal to selectively cause the valve spool to move against the force of the spring such that said second land blocks the second set of outlet ports and the first land opens the first set of outlet ports.

A valve sleeve, a spool, a fluid flow system and a method are all also disclosed.

These and other features of this application will be best understood from the following specification and drawings, the following of which is a brief description.

DETAILED DESCRIPTION

Figure 1:
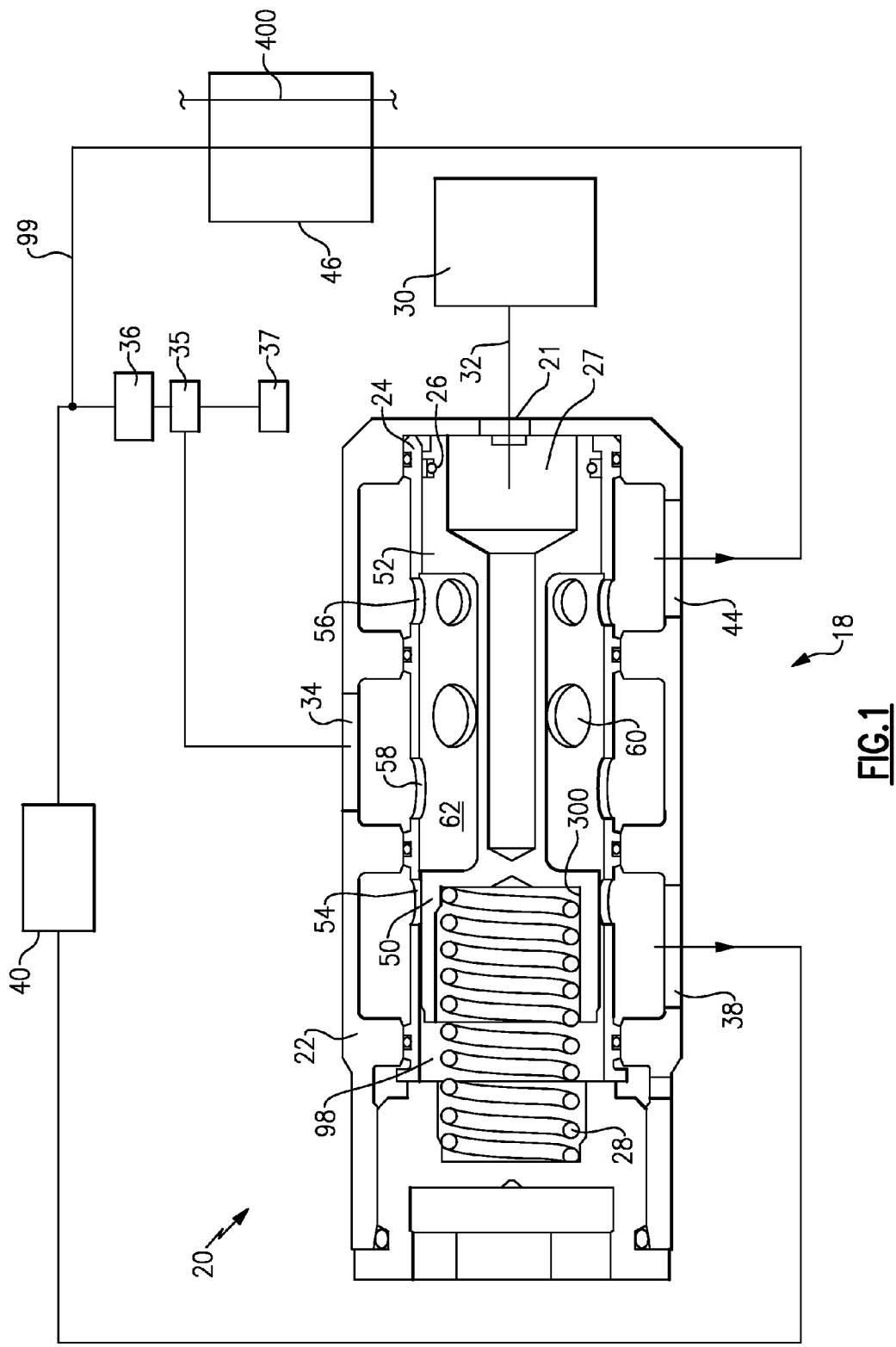
FIG. 1 schematically shows a pumping system, and including a bypass directional control valve.

FIG. 1 illustrates a pumping system 18 including a gear pump 36 delivering an output flow to a pressure regulating valve 35. The pressure regulating valve 35 may direct some of the output of the gear pump 36 back to an inlet 34 of a housing 22 in a bypass directional control valve 20. A use 37 is shown downstream of the pressure regulating valve 35. A disclosed use for this system may be a fuel control system on an aircraft, and for supplying fuel to a gas turbine engine.

From the inlet 34, the inlet fluid passes through two sets of inlet ports 58 and 60 in a valve sleeve 24. The fluid then passes into a chamber 62 defined in an interior bore of sleeve 24.

A valve spool 26 is positioned to selectively communicate the chamber 62 to a set of output ports 56 associated with an outlet 44, or a set of outlet ports 54 associated with a second outlet 38 in the housing 22. A spring 28 sits in a chamber 300 in spool 26, and biases the spool 26 to the right, and to a position where it directs all of the flow through the set of outlet ports 56 and to the outlet port 44, and a land 50 blocks the set of ports 54 leading to the outlet 38.

A pressure signal 32 is received from a pressure metering valve 30. The pressure signal 32 communicates with a chamber 27 through port 21 wherein a pressure acts in opposition to a spring 28 and a drain pressure signal 98 in the spring chamber 300 (also referred to generally as a bias force). As the pressure signal 32 is increased the spring biasing force is overcome to drive the spool 26 to the left. As can be appreciated, should the spool 26 be driven to the left from the illustrated position in FIG. 1, then the land 50 will no longer block the set of ports 54, however, a land 52 will begin to block the set of ports 56. This will cause more of the fuel to be directed to the outlet 38, compared to the amount being directed to the outlet 44. Fuel delivered to the outlet 38 passes through a filter 40, and eventually back to the inlet of the gear pump 36. Fuel directed to the outlet 44 passes through a fuel oil cooler 46, for purposes of controlling heat within the fuel system.

The metering valve 30 selectively controls the amount of fuel delivered to the fuel oil cooler 46, from the port 44, compared to the amount of fluid not being delivered to the fuel oil cooler 46, and delivered through the port 38. In this manner, the amount of cooling being provided for the oil flow 400, and the temperature of the fuel being returned to the pump 36 can be controlled. As can be appreciated, fuel 99 circulates through the fuel oil cooler 46 to cool the oil in line 400.

Figure 2:
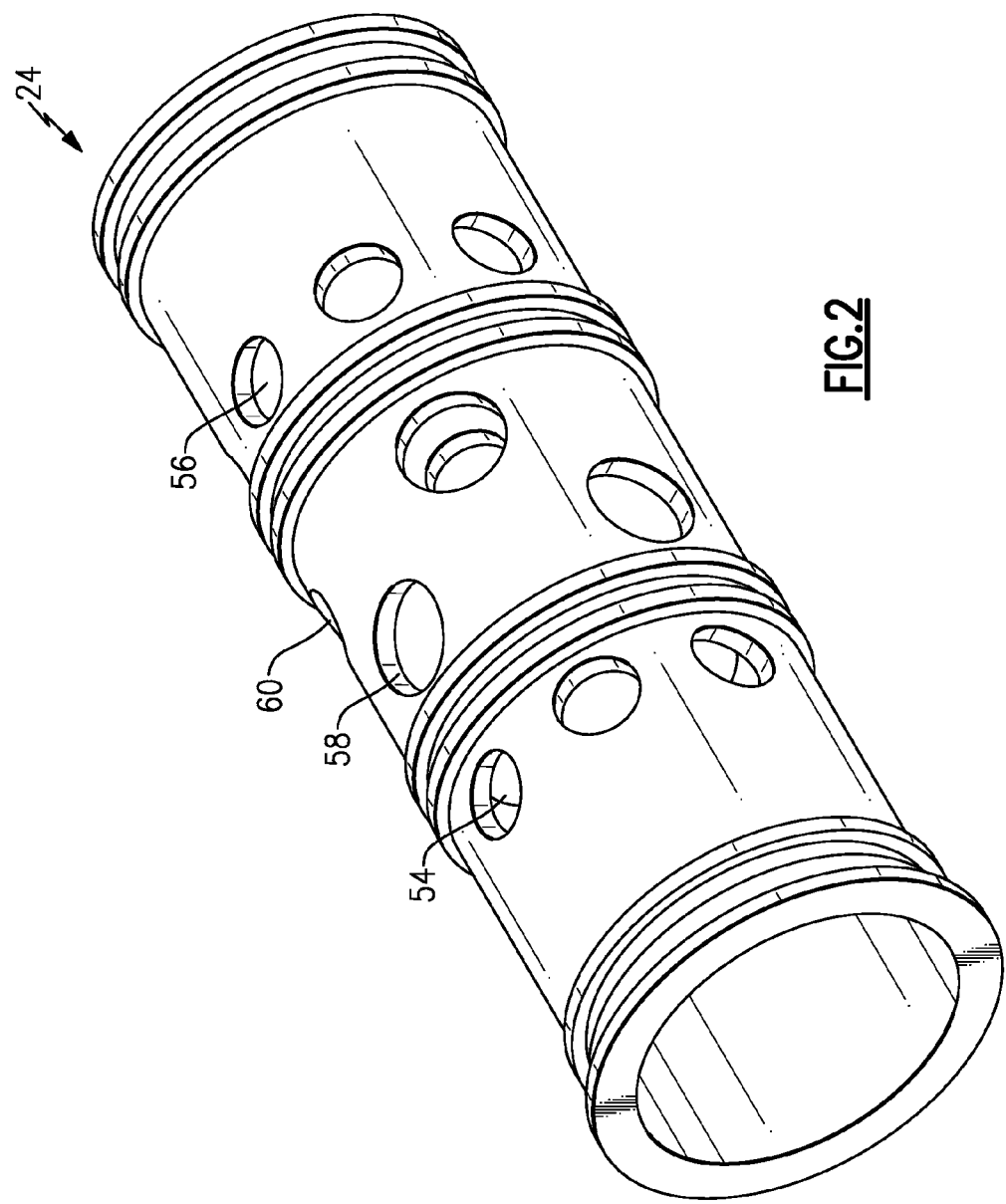
FIG. 2 shows a sleeve.

FIG. 2 shows the valve sleeve 24 having the four sets of ports 54, 56, 58 and 60. The ports 54, 56, 58, and 60 are all simple drilled cylindrical holes. In one embodiment, there are eight ports 54 and eight ports 56, and four ports 58 and four ports 60. As can be appreciated from FIG. 2, the inlet ports 58 and 60 are circumferentially staggered between the two sets, while the ports 54 and 56 are generally aligned between those two sets of ports. Also, inlet ports 58 and 60 have a larger diameter than ports 54 and 56.

Figure 3:
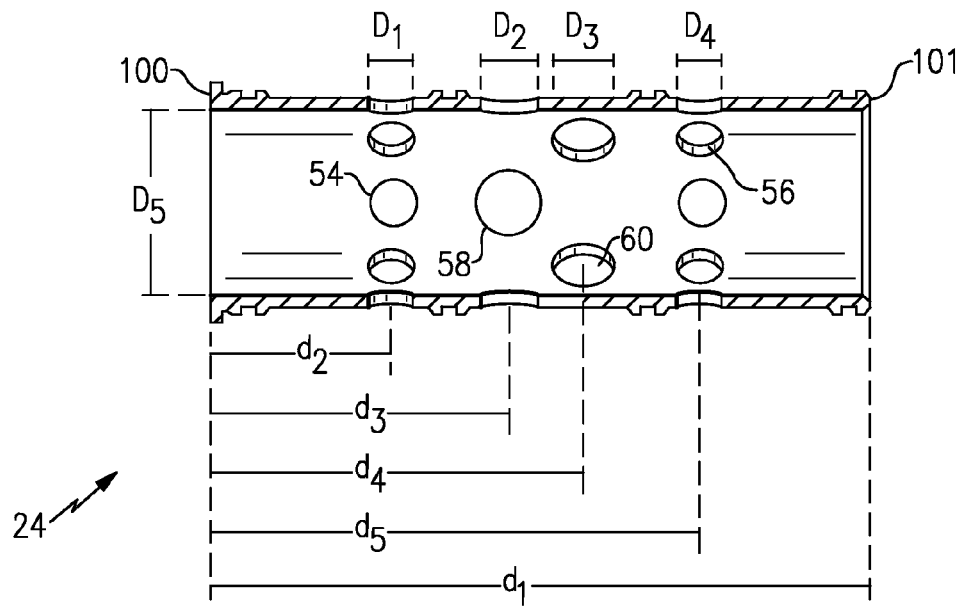
FIG. 3 is a cross-sectional view through the sleeve.

FIG. 3 shows a cross-section of the sleeve 24. An end 100 is defined associated with the end closest to ports 54. An opposed end 101 is spaced from end 100 by a distance $d_1$. A center of the ports 54 is spaced by a distance $d_2$ from the end 100. A center of the ports 58 is spaced by a distance $d_3$ from the end 100. A center of the ports 60 is spaced by a distance $d_4$ from the end 100. A center of the ports 56 is spaced by a distance $d_5$ from the end 100. The ports 54 have a diameter $D_1$, the ports 58 have a diameter $D_2$, the ports 60 have a diameter $D_3$, and the ports 56 have a diameter $D_4$. A diameter $D_5$ is defined for the inner bore of the sleeve 24.

In embodiments, $d_1$ was 4.423 inch (11.234 cm), $d_2$ was 1.226 inch (3.114 cm), $d_3$ was 2.004 inch (5.090 cm), $d_4$ was 2.506 inch (6.365 cm), and $d_5$ was 3.287 inch (8.349 cm).

$D_1$ was 0.310 inch (0.787 cm), $D_2$ was 0.406 inch (1.031 cm), $D_3$ was 0.406 inch (1.031 cm), $D_4$ was 0.310 inch (0.787 cm), and $D_5$ was 1.242 inch (3.155 cm).

In embodiments, a ratio of $D_2$ to $D_1$ was between 1.269 and 1.348. A ratio of $d_1$ to $d_2$ was between 3.600 and 3.615, and a ratio of $d_3$ to $d_1$ was between 0.452 and 0.454, and a ratio of $d_4$ to $d_1$ was between 0.565_ and 0.568, and finally a ratio of $d_5$ to $d_1$ was between 0.742 and 0.744. In embodiments, $D_1$ and $D_4$ were equal, and $D_2$ and $D_3$ were equal. In embodiments, a ratio of $D_5$ to $D_2$ was between 3.019 and 3.100.

Figure 4:
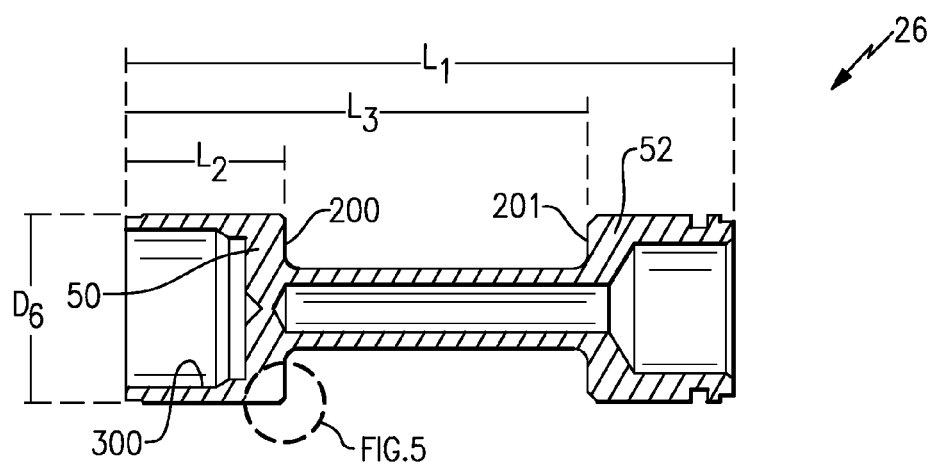
FIG. 4 is a cross-sectional view through a valve spool.

FIG. 4 shows the valve spool 26. As shown, an inner end 200 of land 50 faces an inner end 201 of land 52. A distance $L_1$, the length of the valve spool 26, is defined between the axially outermost ends of the spool 26, and a distance $L_2$ is defined between the end most adjacent to the land 50, and the end 200. A distance $L_3$ is defined between the end most adjacent to the land 50, and the inner end 201 of the opposed land 52. A diameter $D_6$ is defined at the outer periphery of the lands 50 and 52.

In embodiments $L_1$ was 4.037 inch (10.254 cm). $L_2$ was 1.051 inch (2.670 cm), $L_3$ was 3.082 inch (7.828 cm), and $D_6$ was 1.241 inch (3.152 cm). In embodiments, a ratio of $L_1$ to $L_2$ was between 3.818 and 3.864, and a ratio of $L_1$ to $L_3$ was between 1.306 and 1.314.

Figure 5:
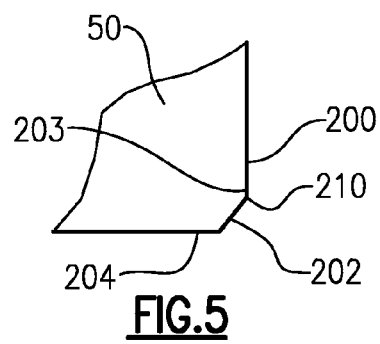
FIG. 5 shows a detail of the FIG. 4 spool inside the area circled at 5.

As shown in FIG. 5, there is an edge break 202 at edges of the land 50. The land 52 would have a similar edge break. The edge break is defined generally as a chamfer between a surface 204 at the outer periphery of the land 50, and the end face 200. In one embodiment, the break 202 is such that a diameter to a point 210, on the wall defining end 200, at the beginning of the chamfer, is less than 0.006 inch (0.0152 cm) short of the full diameter $D_6$. In embodiments, a ratio of a diameter to opposed points 210 and $D_6$ is between 0.995 and 1.000.

In a method of repair, a valve sleeve or valve spool (or both), as disclosed above, is removed and replaced.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A bypass directional control valve comprising:
a valve sleeve received in a housing, said housing having an input opening to receive a source of fluid, and said input opening communicating with two sets of inlet ports formed through said valve sleeve, and into an interior bore of said valve sleeve, two sets of outlet ports, with one on each of two axial sides of said sets of inlet ports, and extending through said valve sleeve, with said outlet and said inlet ports all being cylindrical holes, and a diameter of said sets of inlet ports being greater than a diameter of said sets of outlet ports, said outlet ports communicating to outlet openings in said housing;
a valve spool movable along an axis within said bore of said valve sleeve, said valve spool having a land associated with each of said sets of said inlet ports, and a spring biasing said valve spool in a first direction such that a first land blocks a first of said sets of outlet ports, and a second land is spaced from a second of said sets of outlet ports, with a pressure tap to receive a pressure control signal to cause said valve spool to selectively move against the force of said spring such that said second land may block said second set of outlet ports and said first land opens said first set of outlet ports;
said valve sleeve extends for a first axial distance between opposed ends, and a first of said sets of said inlet ports is spaced from said end by a second distance, and a ratio of said first distance to said second distance is between 3.600 and 3.615;
said outlet ports in said two sets of outlet ports are circumferentially aligned, and said inlet ports in said two sets of inlet ports are circumferentially staggered between the two sets; and
said valve spool extends for a first length, and a second length defined between an end of said valve spool which receives said spring, and an end of said first land which is closest to said spring, with a ratio of said first length to said second length being between 3.818 and 3.864;
said first and second lands have edge breaks at an edge, and said lands have a nominal outer diameter, with an edge break outer diameter defined to a beginning of the edge break on said lands, and a ratio of said edge break outer diameter to said nominal outer diameter being between 0.995 and 1.000.

2. The control valve as set forth in claim 1, wherein a ratio of the diameter of said inlet ports to the diameter of said outlet ports is between 1.269 and 1.348.

3. A valve sleeve comprising:
a valve sleeve to be received in a housing, with two sets of inlet ports formed through said valve sleeve, and into an interior bore of said valve sleeve, and two sets of outlet ports, with one on each of two axial sides of said sets of inlet ports, and extending through said valve sleeve, with said outlet and said inlet ports all being cylindrical holes, and a diameter of said sets of inlet ports being be greater than a diameter of said outlet ports;
a ratio of the diameter of said inlet ports to the diameter of said outlet ports is between 1.269 and 1.348;
said valve sleeve extends for a first axial distance between opposed ends, and a first of said sets of said inlet ports is spaced from said end by a second distance, and a ratio of said first distance to said second distance is between 3.600 and 3.615; and
said outlet ports in said two sets of outlet ports are circumferentially aligned, and said inlet ports in said two sets of inlet ports are circumferentially staggered between the two sets.

4. A fluid flow system comprising:
a pump for delivering fluid to a downstream use, said pump delivering fluid through a pressure regulating valve, said pressure regulating valve being operable to bypass a portion of fluid to a bidirectional control valve;
the bidirectional control valve including a valve sleeve received in a housing, said housing having an input opening to receive a source of fluid, and said input opening communicating with two sets of inlet ports formed through said valve sleeve, and into an interior bore of said valve sleeve, two sets of outlet ports, with one on each of two axial sides of said sets of inlet ports, and extending through said valve sleeve, with said outlet and said inlet ports all being cylindrical holes, and a diameter of said sets of inlet ports being greater than a diameter of said sets of outlet ports, said outlet ports communicating to outlet openings in said housing, and a valve spool movable along an axis within said bore of said valve sleeve, said valve spool having a land associated with each of said sets of said outlet ports, and a spring biasing said valve spool in a first direction such that a first land blocks a first of said sets of outlet ports, and a second land is spaced from a second of said sets of outlet ports, with a pressure tap to receive a pressure control signal to cause said valve spool to selectively move against the force of said spring such that said second land may block said second set of outlet ports and said first land opens said first set of outlet ports;

said valve sleeve extends for a first axial distance between opposed ends, and a first of said sets of said inlet ports is spaced from said end by a second distance, and a ratio of said first distance to said second distance is between 3.600 and 3.615;

said outlet ports in said two sets of outlet ports are circumferentially aligned, and said inlet ports in said two sets of inlet ports are circumferentially staggered between the two sets;

said valve spool extends for a first length, and a second length defined between an end of said valve spool which receives said spring, and an end of said first land which is closest to said spring, with a ratio of said first length to said second length being between 3.818 and 3.864; and said first and second lands have edge breaks at an edge, and said lands have a nominal outer diameter, with an edge break outer diameter defined to a beginning of the edge break on said lands, and a ratio of said edge break outer diameter to said nominal outer diameter being between 0.995 and 1.000.

5. A fluid flow system as set forth in claim 4, wherein said second set of outlet ports communicate with an outlet opening for delivering the fluid through a heat exchanger and back to a pump, and the first set of outlet ports communicate with an outlet opening for delivering fluid back to the pump without passing through the heat exchanger.

6. The fluid flow system as set forth in claim 5, wherein a metering valve sends a control pressure to valve spool to move the valve spool to control the flow of fluid between the outlet openings.

7. The fluid flow system as set forth in claim 6, wherein the heat exchanger is a fuel oil cooler on a gas turbine engine.

8. The fluid flow system as set forth in claim 5, wherein the pump is a gear pump.

9. The fluid flow system as set forth in claim 4, wherein a ratio of the diameter of said inlet ports to the diameter of said outlet ports is between 1.269 and 1.348.

10. A method of replacing a valve sleeve in a bypass directional control valve, including the steps of:

removing a valve sleeve from a bypass directional control valve, and replacing said valve sleeve with a replacement valve sleeve; and wherein the replacement valve sleeve is received in a housing, said housing includes an input opening to receive a source of fluid, and said input opening communicating with two sets of inlet ports formed through said replacement valve sleeve, and into an interior bore of said replacement valve sleeve, and two sets of outlet ports with one set on each of two axial sides from said inlet ports, and extending through said replacement valve sleeve, with said outlet ports and said inlet ports all being cylindrical holes, and a diameter of said inlet ports being greater than a diameter of said outlet ports, and said outlet ports communicating to outlet openings in said housing;

wherein a ratio of the diameter of said inlet ports to the diameter of said outlet ports is between 1.269 and 1.348;

said replacement valve sleeve extends for a first axial distance between opposed ends, and a first of said sets of said inlet ports is spaced from said end by a second distance, and a ratio of said first distance to said second distance is between 3.600 and 3.615; and said outlet ports in said two sets of outlet ports are circumferentially aligned, and said inlet ports in said two sets of inlet ports are circumferentially staggered between the two sets.

\* \* \* \* \*